United States Patent
Tokumitsu (10) Patent No.: US 8,171,818 B2
(45) Date of Patent: May 8, 2012

(54) INDUSTRIAL ROBOT HAVING ELECTRIC CABLE CONNECTING MOVABLE BODY AND FIXED BODY THEREOF

(75) Inventor: Takamasa Tokumitsu, Handa (JP)

(73) Assignee: Denso Wave Incorporated, Tokyo (JP)

( * ) Notice: Subject to any disclaimer, the term of this patent is extended or adjusted under 35 U.S.C. 154(b) by 588 days.

(21) Appl. No.: 12/292,111

(22) Filed: Nov. 12, 2008

(65) Prior Publication Data

US 2009/0121089 A1    May 14, 2009

(30) Foreign Application Priority Data

Nov. 13, 2007    (JP) ................................ 2007-294236

(51) Int. Cl.
    *B25J 18/00*    (2006.01)
(52) U.S. Cl. ........................................ 74/490.1; 901/16
(58) Field of Classification Search ............... 74/490.01, 74/490.02; 414/749.1, 589, 591, 913; 901/14, 901/15, 16
    See application file for complete search history.

(56) References Cited

U.S. PATENT DOCUMENTS

| | | | |
|---|---|---|---|
| 4,642,752 A * | 2/1987 | Debarbieri et al. | ............ 700/160 |
| 5,274,213 A * | 12/1993 | Sartorio | .................... 219/125.1 |
| 2009/0121089 A1 | 5/2009 | Tokumitsu | |

FOREIGN PATENT DOCUMENTS

| | | |
|---|---|---|
| JP | U-61-20284 | 2/1986 |
| JP | A-7-52078 | 2/1995 |
| JP | A-10-217179 | 8/1998 |
| JP | A-2009-137003 | 6/2009 |

OTHER PUBLICATIONS

Aug. 18, 2011 Office Action issued in Japanese Patent Application No. 2008-273044 (with translation).

* cited by examiner

*Primary Examiner* — Thomas R Hannon
*Assistant Examiner* — Phillip A Johnson
(74) *Attorney, Agent, or Firm* — Oliff & Berridge, PLC (57) ABSTRACT

A robot comprises a fixed body, a movable body, and a flat-shaped cable. The fixed body is at least unmovable in a vertical direction. The movable body is movably connected to the fixed body in a predetermined movable range in the vertical direction and has an end to which a tool is attached, the tool performing operations on a workplace. The cable bundle has a plurality of cables for electric power supply and control communication among the fixed and movable bodies and the tool. The cable bundle has two ends. One end is fixedly connected to a fixing position of the fixed body, while the other end is fixedly connected to a fixing position of the movable body which is equal to or higher than the position of the fixed body in the vertical direction in a state where the movable body is located at a highest highest position within the movable range of the movable body.

4 Claims, 8 Drawing Sheets

INDUSTRIAL ROBOT HAVING ELECTRIC CABLE CONNECTING MOVABLE BODY AND FIXED BODY THEREOF

CROSS REFERENCE TO RELATED APPLICATION

The present application relates to and incorporates by reference Japanese Patent application No 2007-294236 filed on Nov. 13, 2007.

BACKGROUND OF THE INVENTION

1. Field of the Invention

The present invention relates to an industrial robot, and in particular, to an industrial robot provided with a fixed body, a movable body movably attached to the fixed body, and an electric cable connected between the fixed body and the movable body for electric power supply and for communication of control of a tool attached to the movable body.

2. Description of the Related Art

A conventional prior art such as disclosed in Japanese unexamined patent publication No. 10-217179 introduces such a robot that comprises a carriage movable in at least one plane direction and a rotatable arm mounted on the carriage. This robot comprises a tool in the arm, and makes the arm rotate to provide operations on a work using the tool, after moving the carriage to a position. Accordingly, this robot has to have a power supply line for electrically connecting the arm and a power source, as well as a signal line for connecting the arm and a controller. This required an electric cable to be placed between the arm and a fixed body, allowing them to move in relative directions.

Generally, the Cableveyers (registered trademark) have been used in cable connections between the fixed bodies and the movable bodies of robots. The Cableveyer consists of a plurality of frames made of synthetic resin and the like that are flexibly connected with one another by pins, and includes a plurality of cables inside the frames. This structure allows the cables to freely bend under a protection of the frames, as the movable body moves, and consistently provides electric power and signals to the movable body.

However, the Cableveyer provided with the frames took a lot of space, which causes a device to be large in size. Further, the cables scrape against the frames as the fixed body and the movable body moved in the relative directions producing abrasion powder of the cables' covers and the frames. Removing the abrasion powder was troublesome.

The aforementioned conventional prior art, therefore, uses a flat cable in a cable connection between the fixed body and the movable body. The flat cable consists of a plurality of cables connected in parallel, and bends freely. The use of the flat cable in replacement of the Cableveyer allows the device to be small in size, and can inhibit the abrasion powder, which is produced by the friction between the cables and frames, from being produced.

The above-mentioned conventional prior art using the flat cable can make the device small in size and can restrain the generation of the abrasion powder caused by the friction of the Cableveyer. However, the flat cable in the conventional prior art can bend freely without any restriction due to its original flexible nature, as the movable body moves relative to the fixed body.

This causes a bent portion of the flat cable to interfere with an obstacle and damages the flat cable, because, unlike the Cableveyer, the flat cable is exposed and is unprotected by a cover.

SUMMARY OF THE INVENTION

The present invention has been invented in view of such problem, and it is therefore an object of the present invention to provide a robot having an exposed flat cable that is free from interference with an obstacle, and is free from any damage.

In order to achieve the object, as one aspect of the invention, there is provided 1. A robot comprising: a fixed body which is at least unmovable in a vertical direction; a movable body which is movably connected to the fixed body in a predetermined movable range in the vertical direction and which has an end to which a tool is attached, the tool performing operations on a workplace; arid a flat-shaped cable bundle having a plurality of cables for electric power supply and to control communication among the fixed and movable bodies and the tool, the cable bundle having two ends, one end of which is fixedly connected to a fixing position of the fixed body and the other of which is fixedly connected to a fixing position of the movable body which is equal to or higher than the position of the fixed body in the vertical direction in a sate where the movable body is located at a highest position within the movable range of the movable body.

Preferably, the cable bundle connects the fixed and movable bodies to have a drooping portion drooping from both fixing positions in the vertical direction; and the cable bundle has a length which is set to permit operations such that i) when the movable body is at the highest position within the movable range, the drooping portion of the flat cable takes a position above a lower end of the movable body as well as a lower end of the fixed body in the vertical direction ii) while the movable body is moving downward in the vertical direction, the drooping portion of the flat cable moves downward together with the movable body, with maintaining a position of the drooping portion above the movable body, and iii) when the movable body reaches a lowest position within the movable range, the drooping portion of the flat cable takes a position above the lower end of the movable body.

Accordingly, the cable bundle always takes a position above the lower end of the movable body. In other words, this robot structure allows the bending portion (particularly the drooping portion) of the cable bundle to follow the downward movement of the movable body. Therefore, even if there is an obstacle ahead of the bending portion of the cable bundle, the cable bundle is prevented from interfering with the obstacle, because the obstacle is hit and removed by the movable body moving ahead of the cable bundle.

Therefore, the use of the posed cable bundle does not induce any damage on the cable bundle because it is prevented from interfering with an obstacle.

It preferred that the cable bundle is fixed to side surfaces of the fixed body and the movable body, the side surfaces being present along a direction in which the fixed body and the movable body face to each other, the cable bundle is apart from the side surfaces of the fixed body and the movable body by a predetermined distance, and the plurality of cables forming the cable bundle are disposed in a direction departing from the side surfaces of the fixed body and the movable body.

Accordingly, when the movable body moves relative to the fixed body, the flat-shaped cable bundle can bend in the direction the drooping portion is to be formed (the direction the flat-shaped cable bundle is forced to bend) while keeping a space from the side surfaces of the fixed body and the movable body. Therefore, the cable bundle is prevented from interfering with the fixed body and the movable body, and is free from overstress and damage.

It is further preferred that the movable body consists of a first movable body movably connected to the fixed body in the vertical direction and the second movable body movably connected to the first movable body in the vertical direction, wherein the first movable body and the second movable body first move downward together for a specific distance from the highest position within the movable range, the second movable body continuously moves downward for a specific distance in the vertical direction down to a lowest position within the movable range, and when the second movable body reaches the lowest position, the drooping portion of the cable bundle takes a position above a lower end of the first movable body.

Accordingly, the downward movement of the second movable body relative to the fixed body and the first movable body does not let the cable bundle contact the lower end of the first movable body, and does not cause the coating of the cable bundle to be damaged by the lower end of the first movable body that may have an edge shape.

Further preferably, the cable bundle has fixed portions fixedly fixed to the fixing positions of the fixed body and the movable body and the fixed portions are directed in the vertical direction and connected to the fixing positions upward in the vertical direction.

Accordingly, the repeating movement of the movable body relative to the fixed body causes the fixed portions of the cable bundle fixed to the fixed body and the movable body not to be chafed, and prevents the coated electric wire from being damaged.

BRIEF DESCRIPTION OF THE DRAWINGS

In the accompanying drawings:

FIG. 8 are pattern diagrams of a side elevation view, where

DETAILED DESCRIPTION OF PREFERRED EMBODIMENTS

A first preferred embodiment of the robot according to the present invention will be described referring to FIGS. 1 to 7. The robot 1 shown in FIG. 1 comprises a pair of stands 2a, 2b, and a slide portion 3 horizontally supported by the stands 2a, 2b at its side ends. The robot 1 provides operations on components carried by a conveyor (not shown) that is positioned below the robot. The structure of the robot is not limited to the one illustrated in FIG. 1.

Figure 2:
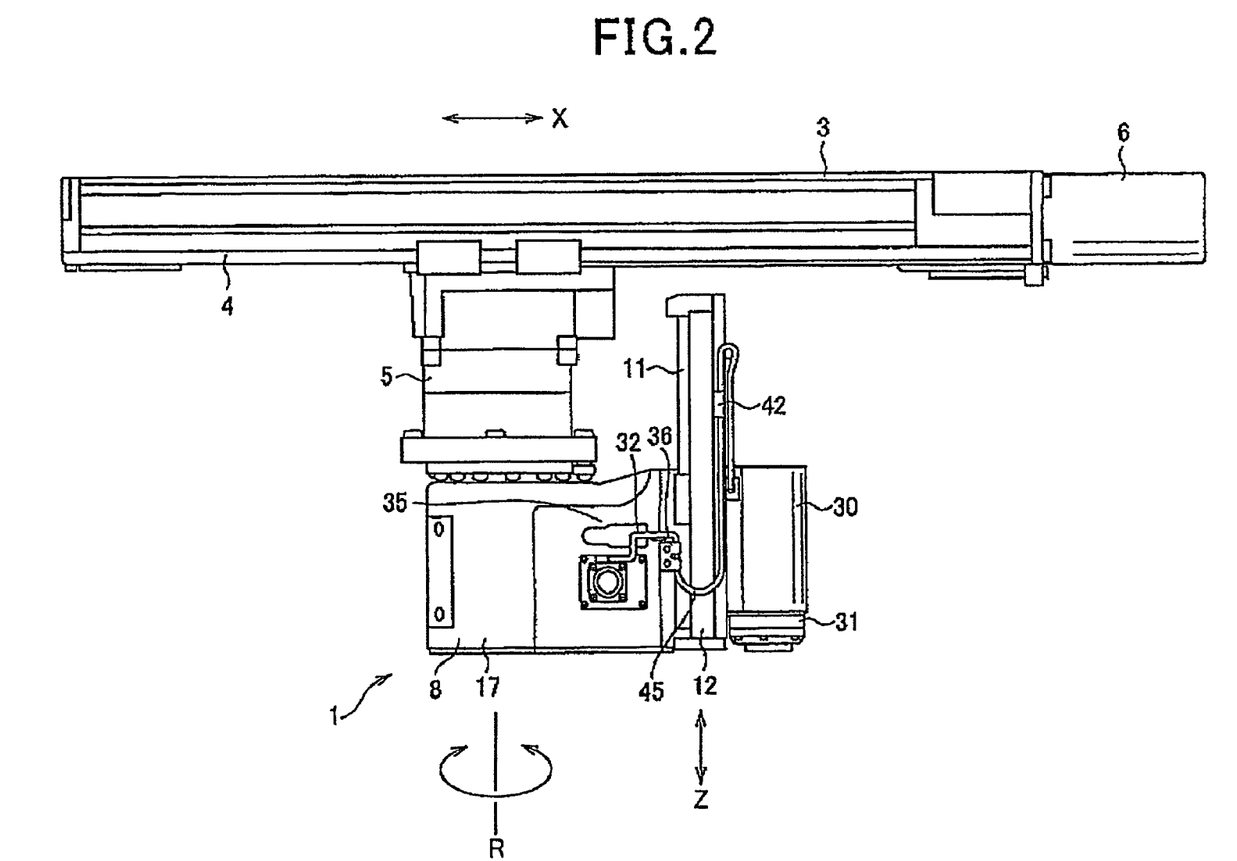
FIG. 2 is a front elevation view of the robot shown in FIG. 1.
Figure 3:
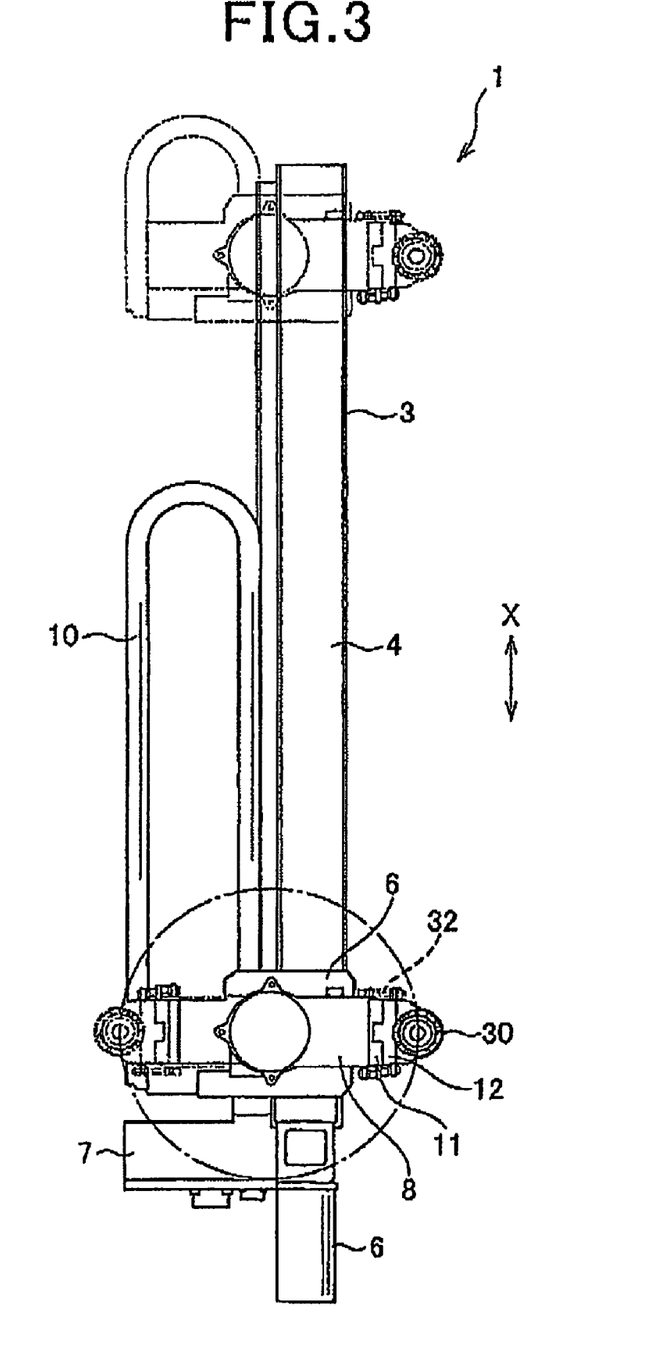
FIG. 3 is a bottom view of the robot shown in FIG. 2.

A rail 4 extending in the lengthwise direction (in the left-and-right direction in FIG. 2) is attached to the lower surface of the slide portion 3. A movable body 5 movably engages with the guide rail 4. The slide portion 3 includes a ball screw (not shown) as a linear shaft. The ball screw included in the slide portion 3 is screwed with a nut (not shown), and the movable body 5 is connected to the nut. A direct driving motor 6 is mounted to the right side end of the slide portion 3 in FIG. 2, and an output shaft (not shown) of the direct driving motor 6 is connected to the ball screw. A power source box 7 is mounted to the side surface of the slide portion 3 as shown in FIG. 3, and the power source box 7 pulls a power supply cable toward itself. The power supply cable is connected to the direct driving motor 6. Accordingly, a rotation of the ball screw driven by the direct driving motor 6 causes the nut, which is not rotating with the slide portion 3, to move along the ball screw, which makes the movable body 5 move in the left-and-right directions (in the X-axis directions) in FIG. 2.

Figure 1:
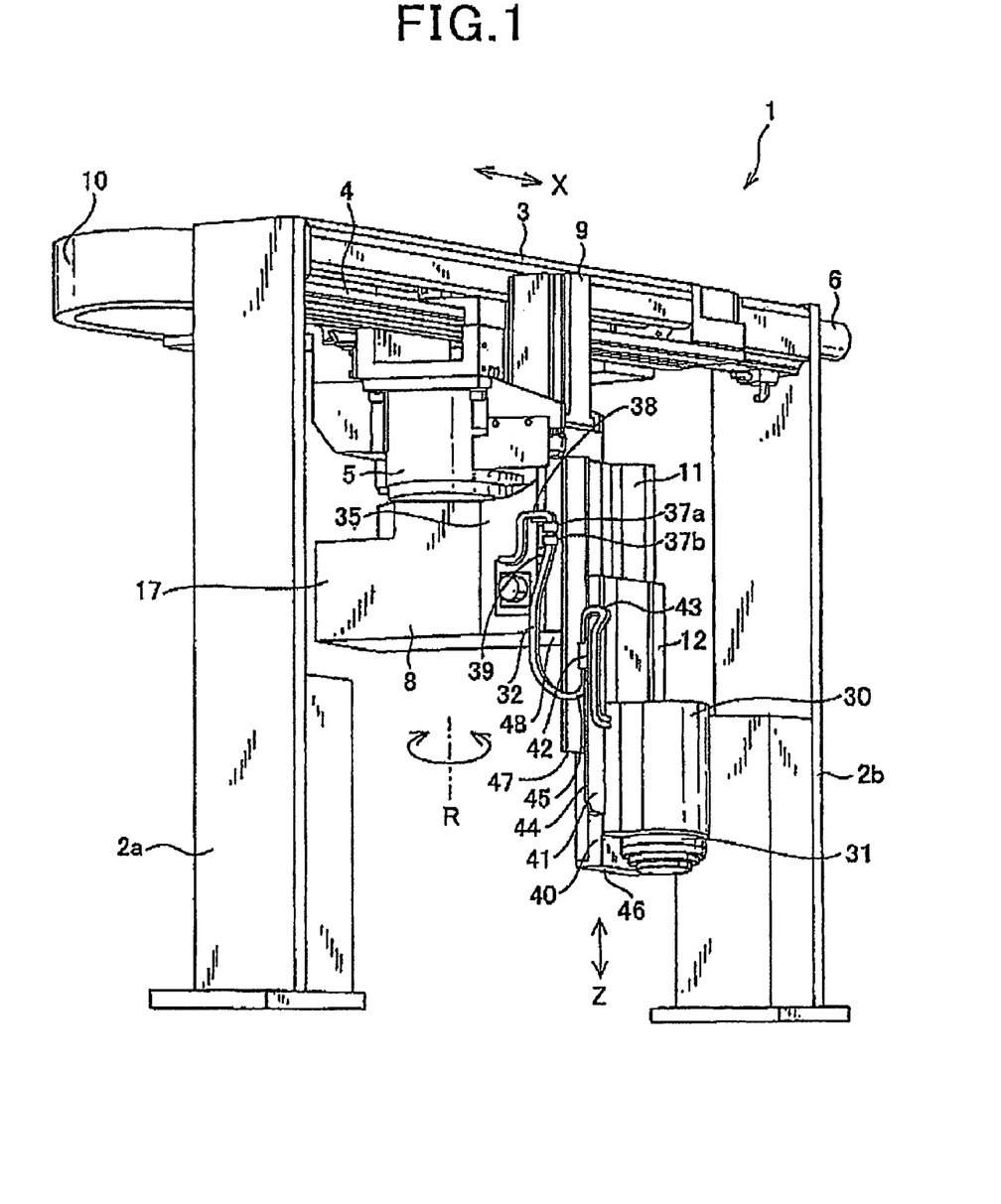
FIG. 1 is a full perspective view of a robot being arranged according to a first preferred embodiment of the present invention.

As shown in FIG. 1, an arm 8 (which corresponds to the fixed body in the present invention) is rotatably mounted to the movable body 5 around the R-axis that is vertical relative to the movable body 5. A motor 9 for rotation is mounted to the movable body 5, and the motor 9 is connected to a power source box 7 by a power supply cable that is covered by a Cableveyer 10. The Cableveyer 10 used in this embodiment is the type used in general. The Cableveyer 10 shown in FIGS. 1 and 3 is presented in a simplified fashion. The motor 9 for rotation is driven by a power source that is supplied through the power supply cable, and the motor 9 rotates the arm 8 in the plane surface around the R-axis.

The arm 8 is restricted from moving up and down. A first elevating member 11 is connected to the arm capable of moving up and down, and a second elevating member 12 is connected to the first elevating member 11 capable of moving up and down relative to the first elevating member 11 (the first elevating member 11 and the second elevating member hereinafter are included in and referred to as the "elevating members"). Accordingly, the first elevating member 11 and the second elevating member 12 are formed in a telescopic form capable of moving up and down, and they can rotate in the plane surface with the arm 8. The first elevating member 11 in this embodiment corresponds to the first movable body in the present invention, while the second elevating member 12 corresponds to the second movable body combined with the rotary shaft motor 30. A combination of the first elevating member 11 and the second elevating member 12 corresponds to the elevating movable body in the invention.

Figure 5:
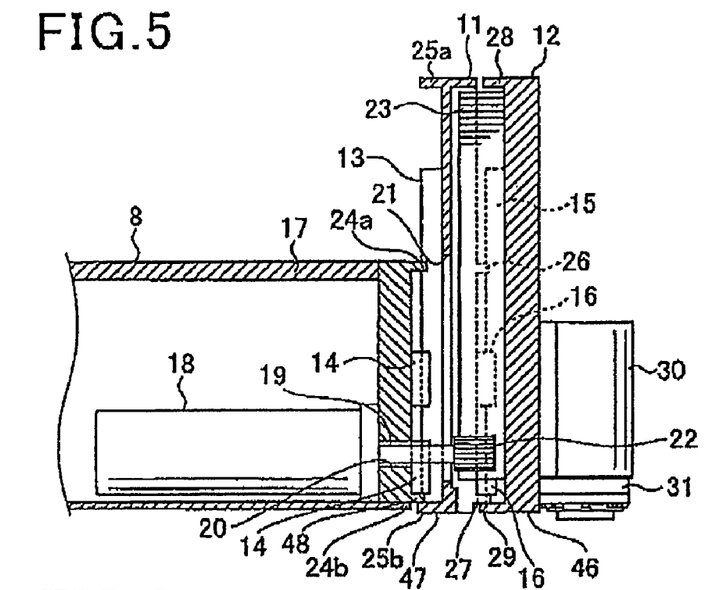
FIG. 5 is a partial sectional view showing an operative mechanism of an elevating member of the robot.

As shown in FIG. 5, a first rail 13 of the first elevating member engages with a pair of first guides 14, 14 vertically disposed on the arm 8. A second rail 15 of he second elevating member 12 engages with a pair of second guides 16, 16 vertically disposed on the first elevating member 11. Accordingly, the arm 8 and the first elevating member 11 move relatively in vertical directions (in the Z-axis directions), and the first elevating member 11 and the second elevating member 12 move relatively in vertical directions (in the Z-axis directions).

An arm housing 17 forming the arm includes an elevating motor 18. An output shaft 19 of the elevating motor 18 passes through a through-hole 20 formed in the arm housing 17 and a slot 21 formed on the first elevating member 11. A pinion gear 22 fixed to the apex of the output shaft 19 engages with a rack 23 provided on the second elevating member 12. The elevating motor 18 is connected to the power supply cable. The elevating motor 18 driven by supplied power source through the power supply cable allows the pinion gear 22 to rotate, which elevates the second elevating member 12 up and down via the rack 23.

A pair of catching parts 24a, 24b project from the upper and lower parts of the side edge of the arm housing 17. An upper stopper 25a is provided at the upper end of the first elevating member 11, facing against the upper catching part 24a. The upper stopper 25a engages with the upper catching part 24a from above. A lower stopper 25b is provided to the lower end of the first elevating member 11, facing against the lower catching part 24b. The lower stopper 25b engages with the lower catching part 24a from below. A stopping element 26 projects from the middle height of the first elevating member 11 at the side opposing the side where the stoppers 25a, 25b project. A locking part 27 projects from the first elevating member 11 below the stopping element 26 at the same side.

A positioning element 28 is formed on the second elevating member 12 at the side opposing the first elevating member 11. The positioning element 28 engages with the stopping element 26 of the first elevating member 11 from above. A supporting element 29 projects from the lower end of the second elevating member 12 at the same side, which engages with the locking part 27 of the first elevating member 11 from below. A rotary shaft motor 30 is mounted to the lower side of the second elevating member 12 at the side opposite to the side that faces the first elevating member 11. A reducer 31 is provided to the lower end of the rotary shaft motor 30. A tool (which corresponds to the tool in the present invention) is connected to the rotary shaft motor 30 through the reducer 31. The tool (not shown) provides operations such as graving, drilling and the like on a workplace. The direct driving motor 6, the motor 9 for ration, the elevating motor 18, and the rotary shaft motor 30 are all controlled by a controller (not shown in the drawings).

Figure 4:
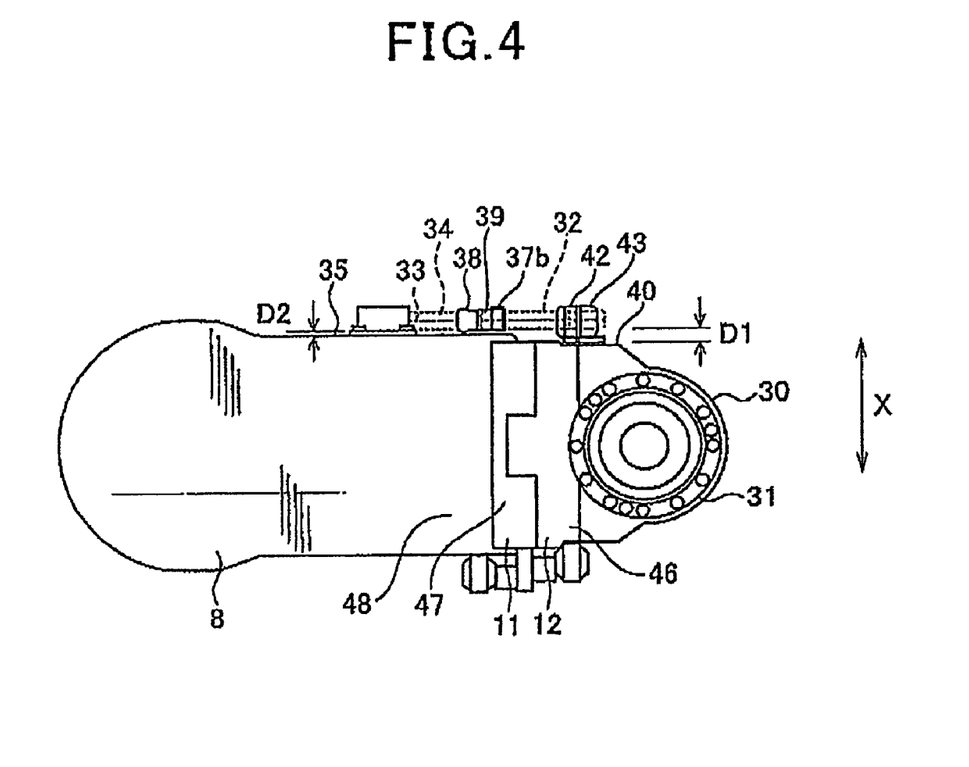
FIG. 4 is an enlarged view of a part of the robot shown in FIG. 3.
Figure 7A:
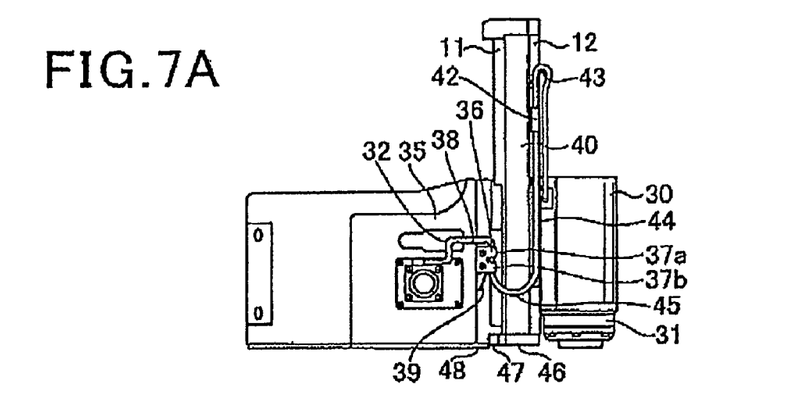
FIG. 7A is a side elevation view showing the elevating members at the top dead point.

The rotary shaft motor 30 receives power from a flat cable 32 (which corresponds to the cable bundle in the invention), which is connected to the power supply cable and drives the tool. As shown in FIG. 4, the flat cable 32 consists of a pair of cables 33, 34 each electric wire is covered by rubber, resin and the like materials. The cables 33, 34 are disposed in parallel and adhered to each other, forming a flat plate configuration. As shown in FIG. 7A, the flat cable 32 is drawn from the arm housing 17 at its side surface 35 that is extended along the direction the arm housing 17 and the first elevating member 11 are facing to each other (in the left-and-right direction in FIG. 4). The flat cable 32 then rises on the side surface 35 and moves in the lateral direction (in the right direction in FIG. 4) toward the first elevating member 11.

Then, the flat cable 32 extends below and is fixed to the side surface 35 of the arm housing 17 by a cable clamp 36. The cable clamp 36 is made of a pressed steel plate or a plate spring, and as shown in FIG. 7A, it is fixed to the side surface 35 of the arm housing 17 by screw bolts. The cable clamp 36 consists of a pair of clamping elements 37a, 37b made of its segment being bent in a hook configuration. As shown in FIG. 4, the flat cable 32 is held by the clamping elements 37a, 37b so as to be apart from the side surface 35 of the arm housing 17. As shown in FIG. 2, the flat cable 32 is held in the direction parallel to the moving directions of the arm 8, the first elevating member 11, and the second elevating member 12. The flat cable 32 is also held in the direction toward the side of the arm 8 from the side of its drooping portion.

A cable guide 38 is placed at the top end of the cable clamp 36 and extended in the horizontal direction. The cable guide 38 holds the flat cable 32, which is drawn from the side surface 35 of the arm housing 17, in the horizontal direction. As shown in FIG. 1, a bending guide 39 extending in an oblique direction is formed at the lower end of the cable clamp 36. The bending guide 39 restrains the bending action of the flat cable 32 when the second elevating member 12 moves downward.

The flat cable 32 droops below the cable clamp 36 then it rises again and is fixed to a side surface 40 (the side surface extending along the direction the arm 8 and the first elevating member 11 are facing to each other) of the second elevating member 12. As shown in FIG. 1, a stopper plate 41 is fixed to the second elevating member 12a at its surface for mounting the rotary shaft motor 30. The stopper plate 41 is made of metal plate and is fixed to the second elevating member 12 by attaching bolds (not shown). A C-clamp 42 is formed at the side end of the stopper plate 41, which holds the flat cable 32. The C-clamp is configured so with a wound edge portion of the stopper plate 41. As shown in FIG. 4, the flat cable 32 held by the C-clamp 42 is apart from the side surface 40 of the second elevating member 12, in the same manner that it is apart form the arm housing 17. As shown in FIG. 2, the flat cable 32 is fixed in the direction parallel to the moving directions of the arm 8, the first elevating member 11, and the second elevating member 12. The flat cable 32 is also fixed in the direction toward the side of the second elevating member 12 from the side of its drooping portion. The flat cable 32 electrically connecting the arm 8 and the rotary shaft motor 30 is mounted such that the cables 33, 34 are disposed in the direction departing from the side surfaces 35, 40 of the arm 8 and the second elevating member 12 (in the upward direction in FIG. 4).

As shown in FIG. 1, the flat cable 32, which extends upward on the side surface 40 of the second elevating member 12 from the C-clamp 42, engages with a bending element 43 formed at the top end of the cable stopper 41, and is bent in the downward direction. The flat cable 32 bent by the bending element 43 extends downward by the cable stopper 41 at the side of the rotary shaft motor 30 and is drawn in the rotary shaft motor 30. The flat cable 32 on the side surface 40 of the second elevating member 12 is restricted from bending toward the side of the rotary shaft motor 30 as it contacts the edge portion 44 of the cable stopper 41.

Figure 6:
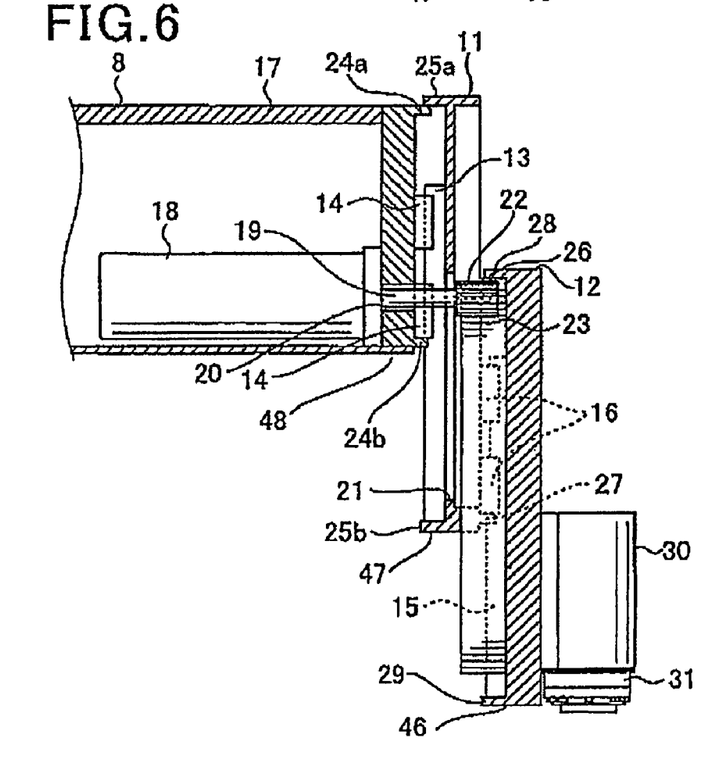
FIG. 6 is a partial sectional view showing a first elevating member and a second elevating member moved to the lowest possible position from the position shown in FIG. 5.
Figure 7B:
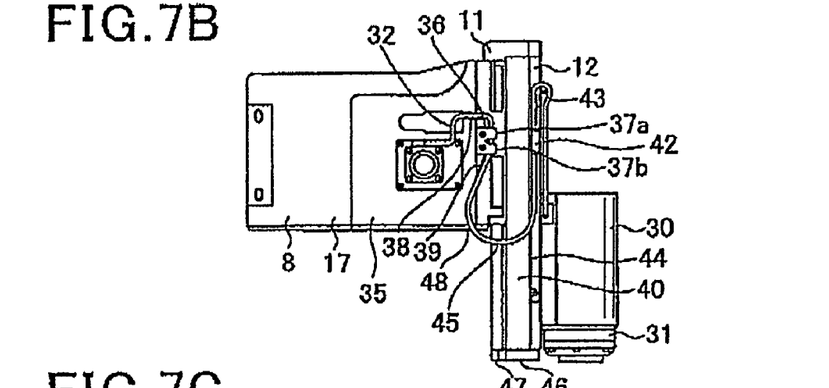
FIG. 7B is a side elevation view showing the same whose first elevating member is at the lowest position.
Figure 7C:
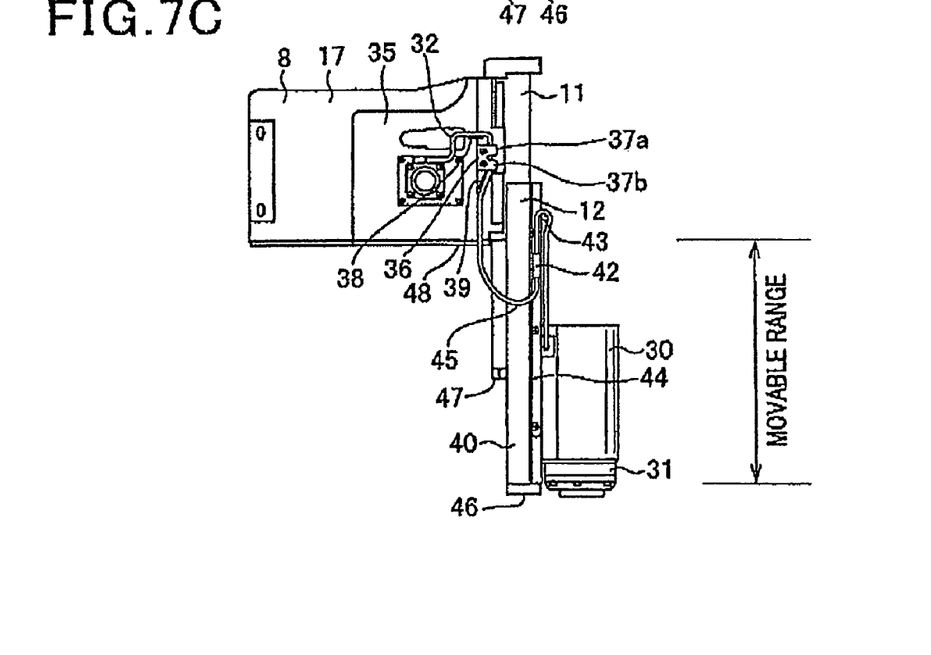
FIG. 7C is a side elevation view showing the elevating members at the bottom dead point.

Referring to FIGS. 5 to 7, the elevation movements of the elevating members 11, 12 having the above-mentioned structure will be described hereinafter. As shown in the same drawings, when the first elevating member 11 and the second elevating member 12 are at the highest positions (the upper dead point) in relative to the arm 8, the second elevating member 12 maintains its position as the rack 23 engages with the unmoving pinion gear 22 connected to the elevating motor 18. The first elevating member 11 maintains its position as the locking part 27 engages with the supporting element 29 of the second elevating member 12.

The elevating motor 18 driven by supplied electric power rotates the pinion gear 22 via the output shaft 19, and the rack 23 engaged with the pinion gear 22 moves the second elevating member 12 in the downward direction. The downward movement of the second elevating member 12 allows the first elevating member 11 supported by the supporting element 29 to move downwardly together with the second elevating member 12 by its own weight.

As shown in FIGS. 6 and 7B, when the first elevating member 11 and the second elevating member 12 move downward for a certain distance by the elevating motor 18, the upper stopper 25a of the first elevating member 11 engages with the upper catching part 24a of the arm housing 17. This causes the first elevating member 11 to stop moving, and allows the second elevating member 12 to continuously move downward relative to the arm 8 and the first elevating member 11.

As shown in FIGS. 6 and 7C, when the positioning element 28 of the second elevating member 12 engages with the stopping element 26 of the first elevating member 11 from above, the second elevating member 12 stops moving. This action causes the controller to stop the driving motion of the elevating motor 18. The driving motion of the elevating motor 18 can be stopped by detection of increased load current in the elevating motor 18 caused by the stopped second elevating member 12, or it can be stopped by detection of driving quantity of the elevating motor 18 using a pulse encoder or the like.

As shown in FIGS. 6 and 7C, driving the elevating motor 18 in the reversed direction causes the first elevating member 11 and the second elevating member 12 to move upward relative to the arm 8 from the lowest position (i.e., the bottom dead point). In this movement, initially, only the second elevating member 12 moves upward in relative to the arm 8 and the first elevating member 11 as the rack 23 moves upward by the rotation of the pinion gear 22.

The upward movement of the second elevating member 12 allows the supporting element 29 to engage with the locking part 27 of the first elevating member 11 supported by the arm 8, and causes the first elevating member 11 to move upward with the second elevating member 12. Then, as shown in FIGS. 5 and 7A, the lower stopper 25b of the first elevating member 11 engages with the lower catching part 24b of the arm housing 17, which prohibits the first elevating member 11 and the second elevating member 12 from moving upward. This action permits the controller to stop the driving motion of the elevating motor 18.

As shown in FIG. 7A, the drooping portion 45 of the flat cable 32 disposed between the portions where the flat cable 32 is fixed to the arm 8 and the second elevating member 12 takes a position above the lower ends 47, 48 of the first elevating member 11 and the second elevating member 12. It also takes a position above the lower end 48 of the arm 8 at the side abutting the first elevating member 11.

As shown in FIG. 7B, while the elevating members 11, 12 are moving downward, the drooping portion 45 of the flat cable 32 moves downward with the first elevating member 11 and the second elevating member 12, maintaining its position above the lower ends 47, 46 of the first elevating member 11 and the second elevating member 12.

As shown in FIG. 7C, when the first elevating member 11 and the second elevating member 12 reach the lowest position relative to the arm 8, the drooping portion 45 of the flat cable 32 takes a position above the lower end 46 of the second elevating member 12. Further, as shown in FIGS. 6 and 7C, when the second elevating member 12 reaches the lowest position relative to the arm 8 and the first elevating member 11, the drooping portion 45 of the flat cable 32 takes a position above the lower end 47 of the first elevating member 11.

According to the preferred embodiment, when the elevating members 11, 12 are at the highest position in relative to the arm 8, the drooping portion 45 of the flat cable 32 takes a position above the lower ends 47, 48 of the first elevating member 11 and the second elevating member 12. The drooping portion 45 also takes a position above the lower end 48 of the arm 8 at the side abutting the first elevating member 11. While the elevating members 11, 12 are moving downward, the drooping portion 45 of the flat cable 32 moves downward together with the first elevating member 11 and the second elevating member 12, maintaining its position above the lower ends 47, 46 of the first elevating member 11 and the second elevating member 12. When the first elevating member 11 and the second elevating member 12 reaches the lowest position relative to the arm 8, the drooping portion 45 of the flat cable 32 takes a position above the lower end 46 of the second elevating member 12.

Accordingly, the flat cable 32 always takes a position above the lower ends 47, 46 of the first elevating member 11 and the second elevating member 12. In other words, this robot structure allows the bending portion (particularly the drooping portion 45) of the flat cable 32 to follow the downward movement of the elevating members 11, 12 so that even if there is an obstacle ahead of the bending portion of the flat cable 32, the obstacle is prevented from interfering with the flat cable 32. It is because the obstacle is hit and removed by the elevating members 11, 12 moving ahead of the flat cable 32.

Accordingly, the use of the exposed flat cable 32 does not induce any damage on the flat cable 32 because it is prevented from interfering with an obstacle.

Further, the flat cable 32 is attached to the side surfaces 35, 40 of the arm 8 and the second elevating member 12. In the X-axis direction as shown in FIG. 4, the flat cable 32 attached to the arm 8 and the second elevating member 12 is held apart from the arm 8, the first elevating member 11, and the second elevating member 12, i.e., the cable bundle is apart from the side surfaces of the fixed body and the movable body by a predetermined distance D1, D2. The cables 33, 34 forming the flat cable 32 are disposed in the direction departing from the side surfaces 35, 40 of the arm 8 and the second elevating member 12.

Accordingly, the first elevating member 11 or the second elevating member 12 moving relative to the arm 8 can bend in the direction the drooping portion 45 is to be formed (the direction the flat-shaped flat cable 32 is forced to bend), while keeping a space from the side surfaces 35, 40 of the arm 8 and the second elevating member 12. Therefore, the flat cable 32 is prevented from interfering with the arm 8, the first elevating member 11, and the second elevating member 12, and is free from overstress and damage.

The elevating members 11, 12 consists of the first elevating member 11 movably connected to the arm 8 in the vertical direction and the second elevating member 12 movably connected to the first elevating member 11 in the vertical direction. After the first elevating member 11 and the second elevating member 12 move downward together for a distance in relative to the arm 8 from the highest position, the second elevating member 12 moves downward relative to the first elevating member 11 that is held by the arm 8. When the second elevating member 12 reaches the lowest position relative to the arm 8 and the first elevating member 11, the drooping portion 45 of the flat cable 32 takes a position above the lower end 47 of the first elevating member 45.

Accordingly, the downward movement of the second elevating member 12 in relative to the arm 8 and the first elevating member 11 does not let the flat cable 32 contact the lower end 47 of the first elevating member 11. This causes the coating of the flat cable 32 not to be damaged by the lower end 47 of the first elevating member 11 that may have an edge shape.

Further, the fixed portions of the flat cable 32 fixed to the arm 8 and the second elevating member 12 are directed in the direction the arm 8 and the second elevating member 12 move, and in the direction from the side of the drooping portion 45 to the side of the arm 8 and the second elevating member 12. In other words, the cable bundle has fixed portions fixedly fixed to the fixing positions of the fixed body and the movable body and the fixed portions are directed in the vertical direction and connected to the fixing positions upward in the vertical direction.

Accordingly, the repeating movement of the elevating members 11, 12 in relative to the arm 8 causes the fixed portions of the flat cable 32 fixed to the arm 8 and the second elevating member 12 not to be chafed, and prevents the coated electric wire from being damaged.

Figure 8A:
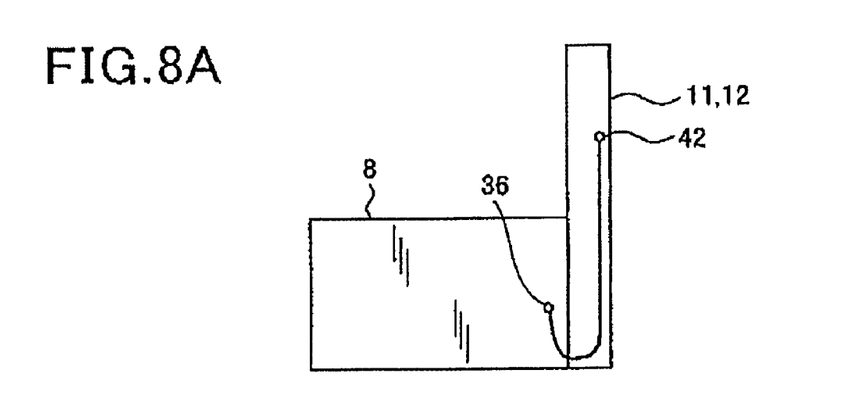
FIG. 8A shows the elevating member at the top dead point.
Figure 8B:
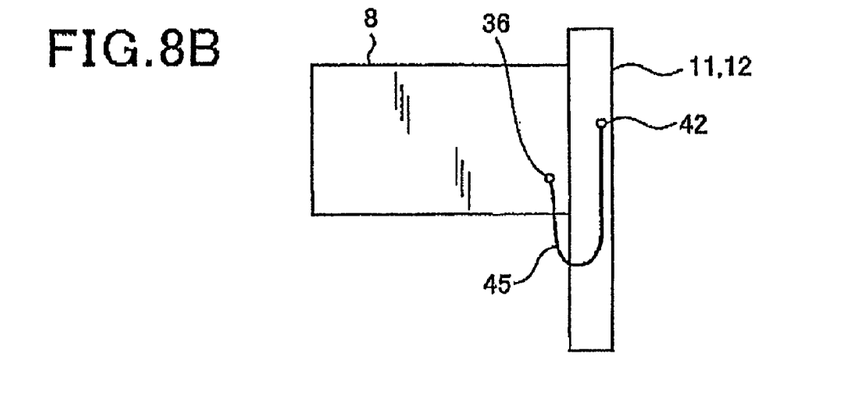
FIG. 8B shows the same whose first elevating member is at the down position.
Figure 8C:
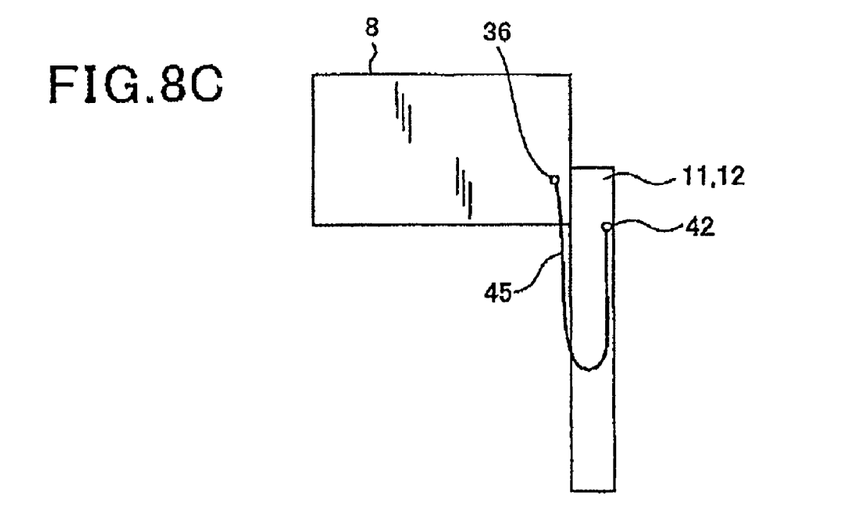
FIG. 8C shows the elevating member at the bottom dead point.

Another explanation is made by referring to FIGS. 8A to 8C for easier understanding. FIGS. 8A to 8C are pattern diagrams of a side elevation view. In FIG. 8A, the elevating member 11, 12 is located at the top dead point, in FIG. 8B, the same whose first elevating member 11, 12 is at the down position, and in FIG. 8C, the elevating member 11, 12 is located at the bottom dead point.

In this pattern diagrams, one end of the flat cable 32 is fixedly connected to a fixing position (the cable clamp 36) of the arm 8 and the other of the flat cable 32 is fixedly connected to a fixing position (the C-clamp 42) of the elevating member 11, 12 which is equal to or higher than the position of the arm 8 in the vertical direction in a state where the elevating member 11,12 is located at an highest highest position within the movable range of the elevating member 11,12.

Since the flat cable 32 is so configured, in all situations shown in FIGS. 8A to 8C, the drooping portion 45 of the flat cable 32 is never lower than the bottom of the elevating members 11, 12 even if it is lower than the bottom of the arm 8 thereby the same effect of the above explained embodiment can be obtained.

Figure 9:
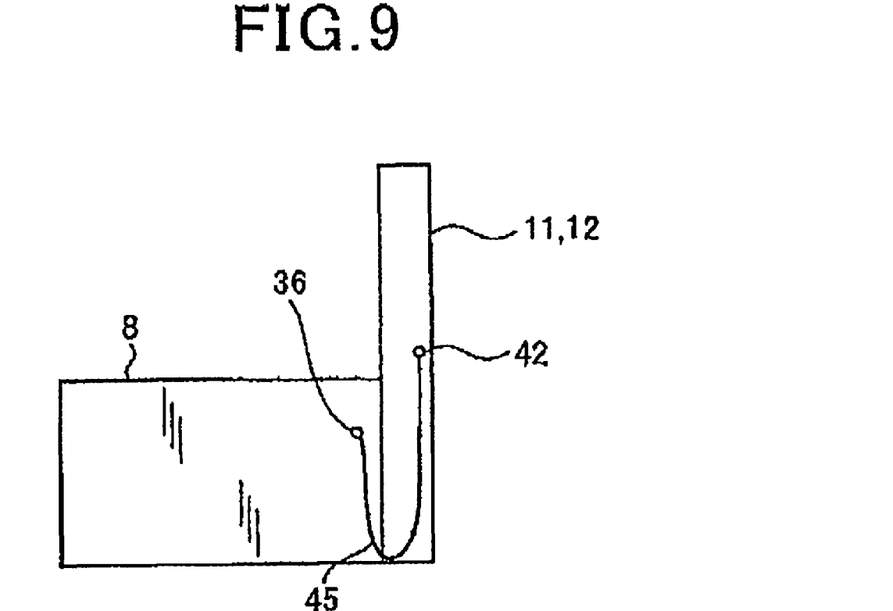
FIG. 9 shows an example deformation of the flat cable.

FIG. 9 shows an example deformation of the flat cable; 32. In FIG. 9, the elevating member 11, 12 is located at the top dead point and the difference of the height between the cable clamp 36 and the C-clamp 42 is small compared with that in FIGS. 8A to 8C. However, the C-clamp 42 is located higher than the cable clamp 36, thereby the same effect of the above explained embodiment can be obtained.

Figure 10:
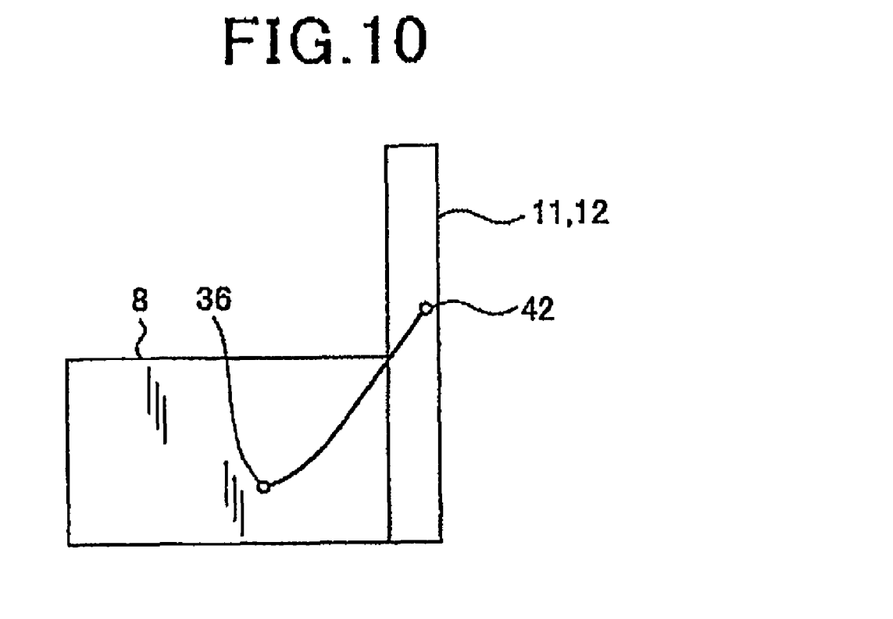
FIG. 10 shows another example deformation of the flat cable.

FIG. 10 shows another example deformation of the flat cable; 32. In FIG. 9, the elevating member 11, 12 is located at the top dead point and the drooping portion 45 is not formed. However, even with this configuration, the same effect of the above explained embodiment can be obtained.

Other Embodiments

The number of cables forming the flat cable 32 can be composed of more than one cable. The movable body 5 can be arranged to move in the left-and-right direction in FIG. 3 (the Y-axis direction), in addition to the X-axis direction. The telescopic elevating members can be composed of more than two members.

While the present invention has been disclosed in terms of the preferred embodiment in order to facilitate better understanding thereof, it should be appreciated that the invention can be embodied in various ways without departing from the principle of the invention.

What is claimed is:

1. A robot comprising:
   a fixed body which is at least unmovable in a vertical direction;
   a movable body which is movably connected to the fixed body in a predetermined movable range in the vertical direction and which has an end to which a tool is attached, the tool performing operations on a workplace; and
   a flat-shaped cable bundle having a plurality of cables for electric power supply and control communication among the fixed and movable bodies, the cable bundle having two ends in a lengthwise direction thereof, one end of which is fixedly connected to a fixing position of the fixed body and the other of which is fixedly connected to a fixing position of the movable body, the cable bundle having a drooping portion drooping from both fixing positions in the vertical direction,
   wherein the cable bundle has a length which permits the drooping portion thereof to operate such that:
      i) when the movable body is equal to or higher than the position of the fixed body in the vertical direction in a state where the movable body is located at a highest position within the movable range, the drooping portion of the cable bundle takes a position above a lower end of the fixed body in the vertical direction;
      ii) while the movable body is moving downward in the vertical direction, the drooping portion of the cable bundle moves downward together with the movable body, while maintaining a position of the drooping portion above the lower end of the movable body; and
      iii) when the movable body reaches a lowest position within the movable range, the drooping portion of the cable bundle takes a position above the lower end of the movable body.

2. The robot as claimed in claim 1, wherein the cable bundle is fixed to a side surface of the fixed body and to a side surface of the movable body, the side surfaces extending along the vertical direction and being located on a same side of a combination of the fixed body and the movable body;
   the cable bundle is fixed apart from the side surfaces of the fixed body and the movable body by a predetermined distance; and
   the plurality of cables forming the cable bundle are disposed in a direction departing from the side surfaces of the fixed body and the movable body.

3. The robot as claimed in claim 2, wherein the movable body consists of a first movable body movably connected to the fixed body in the vertical direction and a second movable body movably connected to the first movable body in the vertical direction,
   wherein the first movable body and the second movable body first move downward together for a first specific distance from the highest position within the movable range, and
   the second movable body continuously moves downward for a second specific distance in the vertical direction down to the lowest position within the movable range, and
   when the second movable body reaches the lowest position within the movable range, the drooping portion of the cable bundle takes a position above a lower end of the first movable body.

4. The robot as claimed in claim 1, wherein the movable body consists of a first movable body movably connected to the fixed body in the vertical direction and a second movable body movably connected to the first movable body in the vertical direction,
   wherein the first movable body and the second movable body first move downward together for a first specific distance from the highest position within the movable range, and
   the second movable body continuously moves downward for a second specific distance in the vertical direction down to the lowest position within the movable range, and
   when the second movable body reaches the lowest position within the movable range, the drooping portion of the cable bundle takes a position above a lower end of the first movable body.

* * * * *